(12) United States Patent
Pollnow et al.

(10) Patent No.: US 7,396,201 B2
(45) Date of Patent: Jul. 8, 2008

(54) LIFT TRAILER DEVICE

(76) Inventors: Cristan D. Pollnow, 13811 Last Line La., Fredericksburg, VA (US) 22407; Steven A. Parks, 50 Burgess La., Fredericksburg, VA (US) 22406

( * ) Notice: Subject to any disclaimer, the term of this patent is extended or adjusted under 35 U.S.C. 154(b) by 112 days.

(21) Appl. No.: 11/072,460

(22) Filed: Mar. 7, 2005

(65) Prior Publication Data

US 2006/0210381 A1  Sep. 21, 2006

(51) Int. Cl.
*B60P 1/02* (2006.01)

(52) U.S. Cl. ........................ 414/482; 414/545

(58) Field of Classification Search ................. 414/481, 414/482, 458, 485, 495, 545, 546; 74/29, 74/89.17, 422

See application file for complete search history.

(56) References Cited

U.S. PATENT DOCUMENTS

| | | | | |
|---|---|---|---|---|
| 4,318,656 A | * | 3/1982 | Ezell | ............................ 414/471 |
| 4,348,054 A | * | 9/1982 | Shonkwiler et al. | ........... 298/11 |
| 4,685,855 A | * | 8/1987 | Celli | ............................ 414/482 |
| 5,288,197 A | * | 2/1994 | Harris | ........................ 414/495 |
| 5,361,704 A | * | 11/1994 | Bounds | ......................... 104/6 |
| 6,698,994 B2 | * | 3/2004 | Barrett | ......................... 414/462 |
| 2002/0081182 A1 | * | 6/2002 | Harris | ........................ 414/477 |
| 2003/0147732 A1 | * | 8/2003 | Bellis, Jr. | ..................... 414/495 |

* cited by examiner

*Primary Examiner*—Saul J. Rodriguez
*Assistant Examiner*—Joshua I Rudawitz
(74) *Attorney, Agent, or Firm*—William L. Klima

(57) ABSTRACT

A lift trailer device configured to load and unload a payload from the ground or a loading dock or any height inbetween.

19 Claims, 4 Drawing Sheets

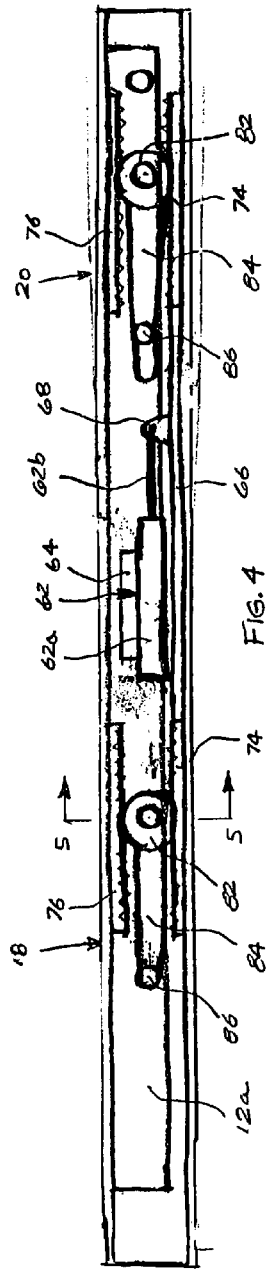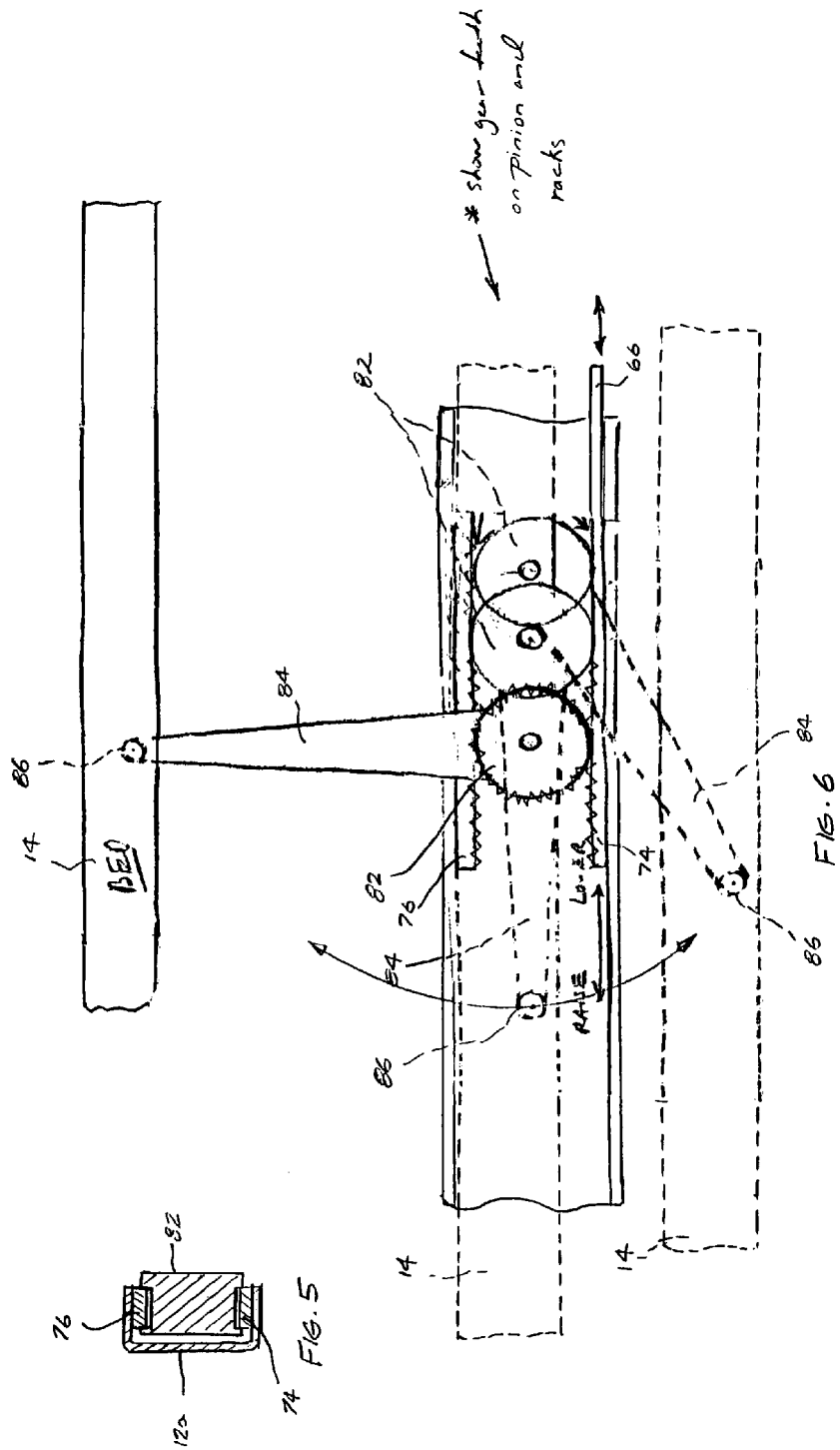

LIFT TRAILER DEVICE

FIELD OF THE INVENTION

The present invention is directed to a lift trailer device, preferably a flat bed lift trailer device for loading, transporting, and unloading a payload.

BACKGROUND OF THE INVENTION

There exists a wide variety of different types of commercial vehicles and trailers for loading, transporting and unloading a payload. One such handy commercial vehicle is a truck having a lift gate provided on the back end thereof. The lift gate eliminates the need for a loading dock to lift and lower heavy payload items into and out of the truck. However, this type of arrangement is expensive, and only suitable for businesses shipping and transporting goods on a regular basis (e.g. daily). Further, the size (length and width) of the lift gate is fairly limited so as to prevent larger or longer items to be loaded into the truck by the lift gate.

Trailers have the advantage of being significantly less expensive than a commercial truck or vehicle. Further, trailers are designed to be pulled by a vehicle, in particular a commercial vehicle, and come in a wide variety of sizes and duties. Many trailers on the market today are configured with a tilting bed so that the bed can be tilted to lower the back edge of the trailer bed down to the loading surface. However, due to the height of the trailer bed when in a raised position, the bed makes a substantial angle with the loading surface when in the lowered position. Thus, it still is difficult or impossible to load heavy items onto the tilt trailer even if loading ramps are used with the tilt trailer. Thus, there exists a need for a trailer having a bed that can be raised and lowered, and be positioned substantially horizontal or at a slight angle relative to the loading surface.

Further, there exists a need for a trailer that can load and unload payloads from the ground or a loading dock or at various heights inbetween. The present invention overcomes the problems associated with tilting trailers.

SUMMARY OF THE INVENTION

An object of the present invention is to provide an improved trailer device.

A second object of the present invention is to provide a lift trailer device.

A third object of the present invention is to provide a flat bed lift trailer device.

A fourth object of the present invention is to provide a lift trailer device including a stationary frame and movable bed.

A fifth object of the present invention is to provide a lift trailer device including a flat bed that can be moved both vertically upward and downward from a locked transportation position while being maintained substantially horizontal.

A sixth object of the present invention is to provide a lift trailer device including a frame and a bed nested within the frame.

A seventh object of the present invention is to provide a lift trailer device, containing a U-shaped frame; a trailer hitch connected to said frame; at least one axle connected to the frame; at least one set of wheels and tires connected to the at least one axle; a movable bed connected to the frame, said movable bed being nested within the U-shaped frame; and at least one actuator connecting the movable bed to the U-shaped frame to move the movable bed up and down relative to the U-shaped frame to load and unload a payload.

A eighth object of the present invention is to provide a lift trailer device, containing a U-shaped frame including a pair of side frame members connected to a front transverse frame member; a trailer hitch connected to the frame; at least one axle connected to the frame; at least one set of wheels and tires connected to the at least one axle; a movable bed connected to the frame, the movable bed being nested within said U-shaped frame; and a plurality of actuators connecting the movable bed to the U-shaped frame to move the movable bed up and down relative to the U-shape frame to load and unload a payload.

A ninth object of the present invention is to provide a lift trailer device, containing a rectangular U-shaped frame including a pair of side frame members connected to a front transverse frame member; a trailer hitch connected to said frame; at least one axle connected to the frame; at least one set of wheel and tires connected to the at least one axle; a rectangular-shaped movable bed connected to the frame, the movable bed being nested within the U-shaped frame; and at least one actuator connecting the movable bed to the U-shaped frame to move the movable bed up and down relative to the U-shape frame to load and unload a payload.

A tenth object of the present invention is to provide a lift trailer device wherein the U-shaped frame includes a pair of side frame members connected to a front transverse frame member.

An eleventh object of the present invention is to provide a lift trailer device wherein the bed is configured in both shape and size to closely nest within the frame providing a small and uniform clearance between an outer edge of said bed and an inner edge of said frame to allow for relative movement therebetween.

A twelfth object of the present invention is to provide a lift trailer device wherein said frame is rectangular-shaped and the bed is rectangular shaped.

A thirteenth object of the present invention is to provide a lift trailer device wherein a back ends of the frame is open ended to expose a back end of the bed.

A fourteenth object of the present invention is to provide a lift trailer device wherein the frame is planar and the bed is planar.

A fifteenth object of the present invention is to provide a lift trailer device wherein the device is configured so that the plane of the bed is maintained parallel to the plane of the frame when the bed is raised and lowered.

A sixteenth object of the present invention is to provide a lift trailer device wherein the lift trailer device is configured to raise and lower the bed relative to the frame supported vertically stationary by the wheels and the tires.

A seventeenth object of the present invention is to provide a lift trailer device wherein the at least one actuator is configured to raise and lower the bed at four spaced apart points on the bed.

An eighteenth object of the present invention is to provide a lift trailer device wherein the at least one actuator is at least one pair of separate actuators located on opposite sides of the bed and located between the bed and the frame.

A nineteenth object of the present invention is to provide a lift trailer device wherein the at least one actuator is defined by four separate actuators including a forward pair of actuators and rearward pair of actuators connected between outer side edges of the bed and inner side edges of the frame.

A twentieth object of the present invention is to provide a lift trailer device wherein the forward actuators and the rearward actuators are configured to operate independently to allow for tilting of the bed.

A twenty-first object of the present invention is to provide a lift trailer device wherein the forward actuators are located at a same forward location along a length of the bed and the rearward actuators are located at a same rearward location along a length of the bed, and said forward location and rearward location are spaced apart.

A twenty-second object of the present invention is to provide a lift trailer device wherein the bed is constructed of bed frame connected to a bed deck.

A twenty-third object of the present invention is to provide a lift trailer device wherein the at least one actuator is a hydraulic actuator.

A twenty-fourth object of the present invention is to provide a lift trailer device wherein the side frame members are defined by side frame rails, and the at least one actuator is located within the side frame rails.

A twenty-fifth object of the present invention is to provide a lift trailer device wherein the at least one actuator includes a hydraulic ram configured to drive a lower movable rack located within the side frame rail and an upper stationary rack located above the lower rack and within the side frame rail, a pinion located between the lower rack and the upper rack, and a crank arm is rigidly connected at one end to the pinion and pivotably connected at an opposite end to the bed, whereby the pinion and the crank arm are rotated when the hydraulic ram forcibly drives the movable lower rack to raise and lower the bed relative to the frame.

A twenty-sixth object of the present invention is to provide a lift trailer device including at least one bed anchor configured to selectively and positively lock the bed to the frame to prevent relative movement therebetween for road travel of the lift trailer device.

A twenty-seventh object of the present invention is to provide a lift trailer device including a frame including a right side frame rail and left side frame rail connected to a front transverse box beam, the frame rails and the box beam located in a same horizontal plane; a trailer hitch connected to the frame; a suspension connected to the frame; at least one axle connected to the suspension; at least one set of tires and wheels connected to the at least one axle; a movable flat bed connected to the frame, said movable flat bed being nested within the frame on the front and sides, and having an exposed trailing edge; a pair of right side lift actuators connecting the movable flat bed to the frame, said pair of right side lift actuators being located inside the right side frame rail, said pair of right side lift actuators, including: a right side slide actuator located inside the right side frame rail, the right side slide actuator being provided with a pair of right side movable racks; a hydraulic ram connected between the right side frame rail and the right side slide actuator configured for moving the right side slide actuator back and forth relative to the right side frame rail; a pair of right side stationary racks located inside and connected to the right side frame rail, the right side stationary racks being configured to cooperate with the right side movable racks; a pair of right side pinions located inside the right side frame rail and each the right side pinions being located between and cooperating with one of the right side movable racks and one of said right side stationary racks; a pair of right side crank arms each connected at one end to one of the right side pinions and connected at an opposite free end and supporting said movable flat bed, whereby when the hydraulic ram is actuated both the pairs of right side pinions and right side crank arms are driven and rotated simultaneously by the right side movable racks of the right side slide actuator to raise or lower said flat bed relative to the frame; a pair of left side lift actuators connecting the movable flat bed to the frame, the pair of left side lift actuators being located inside said right side frame rail, the pair of left side lift actuators, including: a left side slide actuator located inside the left side frame rail, the left side slide actuator being provided with a pair of left side movable racks; a hydraulic ram connected between the left side frame rail and the left side slide actuator configured for moving the left side slide actuator back and forth relative to the left side frame rail; a pair of left side stationary racks located inside and connected to the left side frame rail, the left side stationary racks being configured to cooperate with the left side movable racks; a pair of left side pinions located inside the left side frame rail and each left side pinions being located between and cooperating with one of the left side movable racks and one of the left side stationary racks; a pair of left side crank arms each connected at one end to one of the left side pinions and connected at an opposite free end and supporting said movable flat bed, whereby when the hydraulic ram is actuated both pairs of left side pinions and left side crank arms are driven and rotated simultaneously by the left side movable racks of the left side slide actuator to raise and lower the flat bed relative to the frame; a locking system provided on the lift trailer device, the locking system configured for selectively positively locking said flat bed to the frame; and a hydraulic system provided on the lift trailer device, the hydraulic system configured for simultaneously and selectively operating the right side hydraulic ram and the left side hydraulic ram for raising and lowering the flat bed relative to the frame.

A twenty-eighth object of the present invention is to provide a lift trailer device including a U-shaped frame; a trailer hitch connected to the frame; a suspension connected to the frame; at least one axle connected to the suspension; at least one set of tires and wheels connected to the at least one axle; a movable bed connected to the frame, said movable bed being nested within the U-shaped frame; at least one actuator connecting the movable, bed to the frame to raise and lower the movable bed relative to the frame to load and unload a payload, the at least one actuator including a slide actuator having at least one movable rack; a hydraulic ram connected between the frame and the slide actuator; a stationary rack connected to the frame; a pinion connected between and cooperating with the movable rack and the stationary rack; and a crank arm having one end connected to the pinion and an opposite free end connected to the movable bed, whereby when the hydraulic ram is actuated said pinion and the crank arm are driven and rotated by the movable rack of the slide actuator to raise and lower said movable bed relative to said frame; and a hydraulic system provided on the lift trailer device, said hydraulic system configured for selectively actuating and controlling movement of the hydraulic ram for raising and lowering the movable bed relative to said frame.

A twenty-ninth object of the present invention is to provide a lift trailer device including a pair of side frame members connected to a front transverse frame member; a trailer hitch connected to the frame; a suspension connected to the frame; at least one axle connected to the suspension; at least one set of tires and wheels connected to the at least one axle; a movable bed connected to the frame, said movable bed being nested within the frame; a plurality of hydraulic actuators connecting the movable bed to the frame and configured to raise and lower the movable bed relative to the frame to load and unload a payload; a locking system including a plurality of locking devices provided on the frame and a plurality of corresponding pin receivers provided on sides of the movable bed, the locking device each including a movable pin configured to be selectively moved in and out of the pin receivers of the movable bed to positively lock the movable bed relative to the frame.

A thirtieth object of the present invention is to provide a lift trailer device configured to allow a payload to be loaded from the ground or a loading dock or at various heights inbetween.

The present invention is directed to a lift trailer device, preferably a flat bed lift trailer device. Specifically, the bed of the lift trailer is preferably a flat bed having a flat or substantially flat upper working surface. However, in some embodiments, the bed can be customized to accommodate a particular type of payload (e.g. motorcycle, glass plate, pipe, piano, office equipment or other specialized payloads).

The lift trailer device according to the present invention includes two (2) main components, including a frame and a movable bed. The frame supports the movable bed configured to be raised or lowered while the bed remains substantially level or slightly tilted. In one preferred embodiment, the bed is a flat bed that can be lowered from the height of the frame to the ground or other loading surface (e.g. stairs) or can be raised to a loading dock. In this manner, the flat bed is essentially laying flat on the ground or positioned even with the loading surface when loading a payload onto the flat bed. When loading is accomplished, the flat bed is raised up or lowered down to the height of the frame.

In a preferred embodiment, the lift trailer device includes a locking arrangement or system for positively locking the flat bed to the frame after the flat bed has been loaded and raised up or lowered down to the height of the frame. The lift trailer device is then ready for to be transported carrying its payload by being hauled behind a vehicle, preferably a commercial vehicle.

In a preferred embodiment, the frame is a U-shaped frame including a pair of side frame rails connected to a front traverse frame member. The frame preferably when constructed or assembled is a one (1) piece or unitary frame unit constructed of separate components joined and/or welded together (e.g. e.g. by using joints, connectors and/or welding). The back end of the frame is left open (i.e. without a back traverse frame member) so that the bed is immediately accessible from the rear of the lift trailer device. In this manner, the frame does not interfere or block loading of payload from the rear of the lift trailer device onto the flat bed.

The frame is preferably constructed from a pair of side frame rails (e.g. having a C-shaped cross section) and welded to a front traverse box beam or tube configured to also serve as a tank for hydraulic fluid (e.g. hermetically sealed). A hitch is part of the frame or a separate component connected to the frame, preferably connected to the front traverse box beam or tube, by fastening and/or welding. Preferably, the front of the hitch is provided or fitted with a conventional type coupler (e.g. class II or III hitch, kingpost type hitch, or heavy duty pintel type hitch).

The lift trailer device according to the present invention includes one or more axles, (e.g. one axle, two axles, three axles, or more) connected via a suspension to the frame. The suspension, for example, can include leaf springs, coil springs, control arms, stabilizer arms, airbags, or conventional suspension components). The lift trailer device according to the present invention can be designed and constructed for a wide variety of payload weight ranges and duties. The size and gauge of the steel, the size and weight of the axles and other components are selected for a particular design and payload weight carrying range.

Preferably, the bed is a flat bed. The flat bed can be constructed of a wide variety of materials, in particular wood, plastic, metal, steel or other suitable materials. Preferably, the flat bed includes an outer beam or tubular steel frame provided with one or more welded cross members with a steel plate decking welded and/or fastened to the tubular steel frame. For example, the decking is made from diamond surfaced steel or aluminum plate stock material, or steel or aluminum plate provided with a non-slip textured upper surface.

The lift trailer device according to the present invention can optionally include railings, fenders, hitch jack, lights, reflectors, license plate holder and/or conventional accessories for a trailer.

In a preferred embodiment, the movable flat bed is connected to the frame. Preferably, the flat bed is connected to the frame by at least one actuator (e.g. hydraulic and/or pneumatic), more preferably a plurality of actuators. For example, the frame is provided with four (4) actuators that connect to and support the flat bed for raising and lowering the flat bed relative to the stationary frame. Two (2) actuators are located on each side of the flat bed with one set configured for lifting or lowering the front portion of the flat bed and another set configured for lifting or lowering the back portion of the flat bed. Preferably, the front set of actuators is configured to be operated independently of the rear set of actuators so that the flat bed can be leveled and/or tilted relative to the length of the frame. Alternatively, all of the actuators can be configured to be operated independently so that the flat bed can be tilted relative to both the length and width direction of the flat bed relative to the frame. Preferably, the lift actuators are configured to be infinitely variably positionable so that the flat bed can be positioned anywhere between the fully raised position to the fully lowered position.

Preferably, the actuators are configured to be compact and fit within the side rails of the frame. In a preferred embodiment, an actuator includes a lower movable rack and an upper stationary rack both positioned inside the side frame rail. A hydraulic ram is also provided inside the side frame rail, and configured to move the lower movable rack relative to the upper movable rack. A pinion (e.g. gear pinion) is located between the upper stationary rack and lower movable rack and engages therewith. The pinion moves and rotates (e.g. clockwise and counter clockwise) when the hydraulic ram is actuated. A crank arm is connected to and extends from the pinion and is configured to rotate with the pinion when the lower movable rack is moved forward or backward by the hydraulic ram. The free end of the crank arm is pivotally connected to the flat bed (e.g. pin connected to end of crank arm fits into hole or slot receiver (e.g. rotary bearing) provided in the side of flat bed). When the actuator is in use, the hydraulic ram pushes or pulls on the lower movable rack causing the pinion and associated crank arm to rotate and move the opposite end of the crank arm upwards or downwards, which is connected to the flat bed. In this manner, the flat bed is raised or lowered relative to the frame.

BRIEF DESCRIPTION OF THE DRAWINGS

FIG. 4 is a partial broken away side elevational view of the inside of the right side frame rail of the lift trailer device shown in FIG. 1.

FIG. 5 is a cross-sectional view of the right side frame rail, as indicated in FIG. 4.

FIG. 6 is a partial broken away side elevational view illustrating the operation of the flat bed relative to the frame at three (3) different positions of the lift trailer device shown in FIG. 1.

DETAILED DESCRIPTION OF THE PREFERRED EMBODIMENTS

Figure 1:
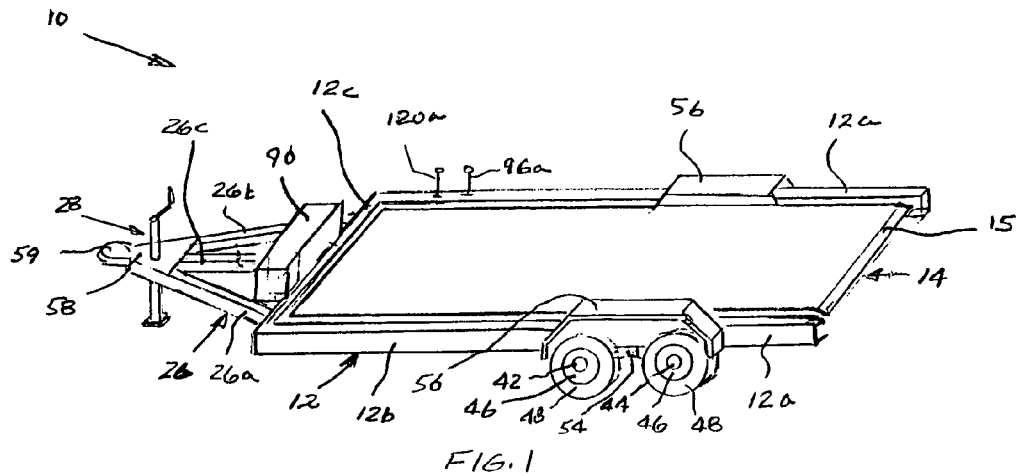
FIG. 1 is a perspective view of a preferred embodiment of the lift trailer device according to the present invention.
Figure 2:
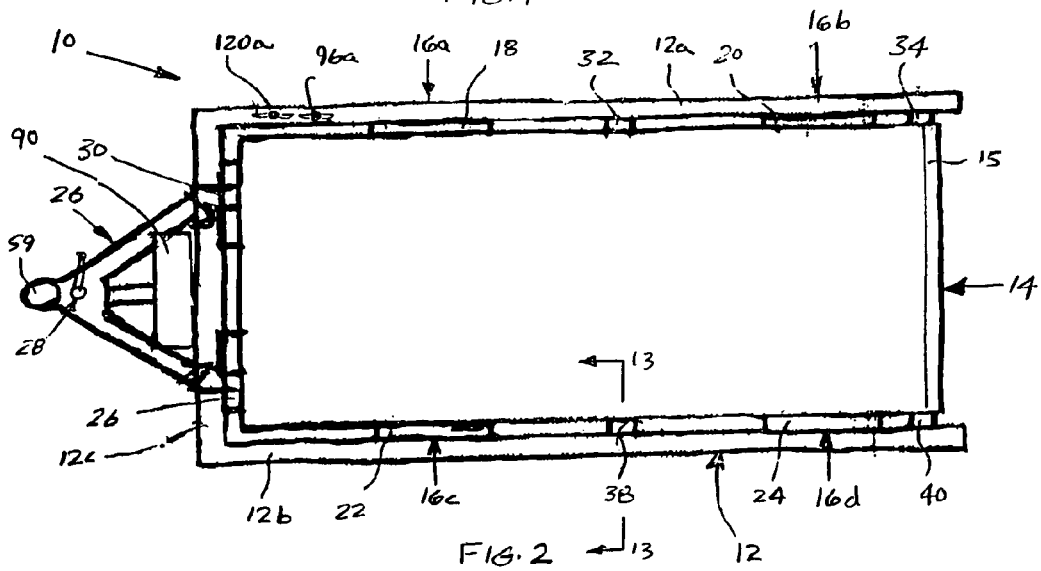
FIG. 2 is a top planar view of the lift trailer device shown in FIG. 1.
Figure 3:
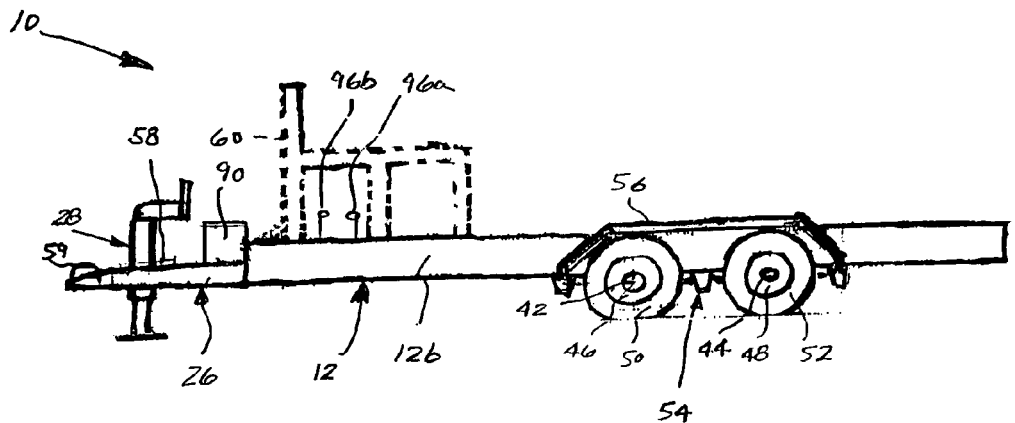
FIG. 3 is a side elevational view of the lift trailer device shown in FIG. 1

A preferred embodiment of the lift trailer device 10 according to the present invention is shown in FIGS. 1-3.

The lift trailer device includes a frame 12 connected to and supporting a flat bed 14. Preferably, the flat bed 14 is provided with a tapering or ramp type trailing edge portion 15 to facilitate loading of objects onto the flat bed 14. The flat bed 14 is connected to the frame 12 at four (4) points or positions 16a, 16b, 16c, 16d by actuators 18, 20, 22, 24, to be described in detail below.

A hitch 26 is connected to the frame 12 by fastening and/or welding. The hitch 26 is provided with a jack 28 for leveling the lift trailer device 10 when disconnected from a towing vehicle.

The frame 12 includes a right side frame rail 12a and a left side frame rail 12b connected to a front traverse box beam or tube 12c. The frame rails 12a and 12b are preferable made from C-shaped steel beams, however, the frame rails 12a and 12b can be made from other structural frame elements or components such as plates, tubing (e.g. rectangular tubing) and/or bars. In any event, it is preferred that the frame 12 be assembled or constructed so as to be a one-piece or unitary integrated frame unit by various fabrication techniques of fastening (e.g. connectors, bolts, rivets) and/or welding parts or components together. The C-shaped side frame rails 12a, 12b are preferred, since the actuators, to be described in detail below, fit inside the side rails 12a, 12b to reduce or minimize the required clearance between the movable flat bed 14 and stationary frame 12.

In a preferred embodiment, the frame rails 12a and 12b are made of rectangular corss-section tubing cut open in places to provide access to the inner space for installing the actuators 18, 20, 22, 24 within the frame rails 12a, 12b.

The lift trailer device 10 is fitted with six (6) bed anchors 30, 32, 34, 36, 38 and 40 designed or configured to positively lock the flat bed 14 to the frame 12. The flat bed 14 is preferably positively locked to the frame 12 during transportation of payload by the lift trailer device 10. The details of the bed anchors 30, 32, 34, 36, 38 and 40 will be described in detail below. In the preferred embodiment shown, six (6) bed anchors are used, however, this number can be increased or decreased depending on a particular design and/or application. In a preferred embodiment shown in FIG. 3, the lift trailer device 10 is configured so that the flat bed 14 is lock to the frame 12 by bed anchors 30, 32, 34, 36, 38 and 40 when the flat bed 14 is positioned or located in the same plane as the frame 12. However, the bed anchors can be repositioned or modified so that the flat bed 14 is located above or below the plane of the frame 12 when locked to the frame 12.

The lift trailer device 10 includes a pair of stub axles 42, 44 supporting wheels 46, 48 fitted with tires 50, 52. The stub axles 42, 44 are supported by and connected to the frame by suspension 54, including, for example, leaf springs, coils springs, air bags, arms, support arms, control arms and/or conventional suspension parts or components. A pair of fenders 56 is connect to the frame side rails 12a, 12b, and cover the sets of wheels 46, 48 fitted with tires 50, 52. The hitch 26 includes a pair of side rails 26a, 26b and center tube 26c connected together by a buttress plate 58 fastened and/or welded together, and supporting a hitch ball receiver 59.

The stub axles 42, 44 are required to allow the flat bed 14 to be lowered to the ground so as to not interfere therewith.

The lift trailer device 10 can optionally be provided with a railing 60, or raised front and side panels (e.g. metal plate and tubing fabricated panels).

The detailed construction of one set of lift actuators 18, 20 located in the right side frame rail 12a is shown in FIGS. 4 to 8. An identical set of lift actuators 22, 24 having the opposite mirror image configuration of the lift actuators 18, 20 are provided in the left side of the trailer as shown in FIG. 2.

The lift actuators 18, 20 include a hydraulic ram 62, having a hydraulic cylinder 62a and hydraulic piston 62b. The hydraulic cylinder 62a is provided with a mounting plate 64 for fastening or welding the hydraulic ram 62 to the inside surface of the right side frame rail 12a. The hydraulic piston 62b connects to a connecting arm 68 of a slide actuator via "clevis" 70 and pin 72 (FIG. 7) provided at the free end of the hydraulic piston 62b. The connecting arm 68 is a metal plate provided with a through hole and welded to the slide actuator 66 so that the hydraulic piston 62b of the hydraulic ram 62 can be connected thereto by clevis 70 and pin 72.

Figure 7:
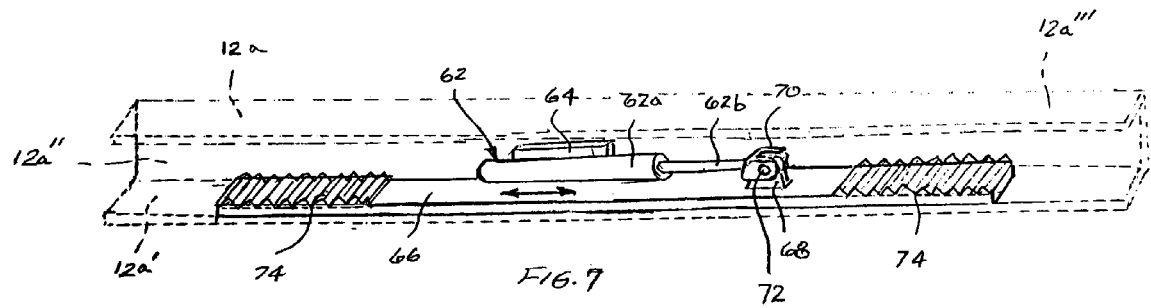
FIG. 7 is a partial broken away perspective view of a portion of the lift actuator located in the right side frame rail of the lift trailer device shown in FIG. 1.

The slide actuator 66 is disposed within the right side frame rail 12a, as shown in FIG. 7, and slides on and is supported by the upper surface of the lower flange 12a' of the right side frame rail 12a. Specifically, the hydraulic ram 62 anchored to the inner surface of the center web 12a" moves the slide actuator 66 back and forth within the side frame rail 12a.

The slide actuator 66 is provided with a pair of "movable" racks 74, 74, as shown in FIG. 7. The inner surface of the upper flange 12a''' of the right side frame rail 12a is provided with a pair of "stationary" racks 76, 76, as shown in FIGS. 4, 5 and 6. The lift actuator 20 (FIG. 8) includes a gear pinion 82 provided with a crank arm 84 provided with a lift pin 86. More specifically, the gear pinion 82 includes a center gear portion 82a, a circular-shaped side plate 82b and a circular-shaped side plate 82c. The crank arm 84 is connected to the circular-shaped side plate 82c, for example, by fabricating two separate pieces of metal welded together, or alternatively, can be machined and/or cut from a single piece of metal. The gear pinion 82 can be made of single piece of metal, and then connected to the side plates 82b, 82c by welding and/or fastening.

The lift pin 86 is connected to the free end of the crank arm 84, and again can be made as a separate piece and then welded or fastened to the free end of the crank arm 84, or can be machined with the crank arm 84 from a single piece of metal. The other lift actuators 18, 22 and 24 have the same or similar configuration to that of the lift actuator 20 shown in FIG. 8. As shown in FIG. 4, the pair of lift actuators 18, 20 are provided inside the right side frame rail 12a, and as shown in FIG. 2, the lift actuators 22, 24 are provided in the left side frame rail 12b. The lift actuators 22, 24 have the mirror image configuration of the lift actuators 18, 20 arrangement shown in FIG. 7, but located in the left side frame rail 12b.

Figure 8:
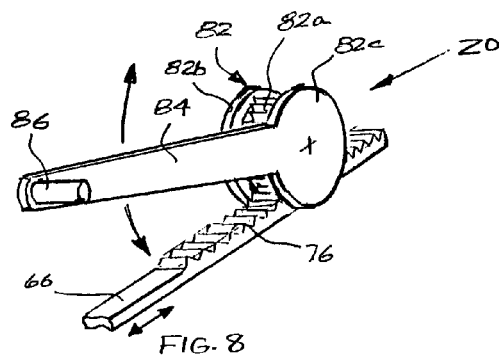
FIG. 8 is a partial broken away perspective view of a portion of one lift actuator of the lift trailer device shown in FIG. 1.
Figure 8A:
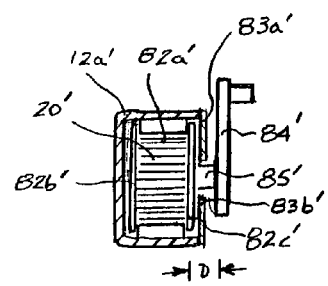
FIG. 8A is a cross-sectional view of the right side frame rail with an alternative embodiment of the lift actuator having a different configuration from that shown in FIG. 8.

Alternative embodiments of the lift actuator 20' and side frame rail 12a' are shown in FIG. 8A.

The lift actuator 20' includes a center gear portion 82a', a circular-shaped side plate 82b' and a circular-shaped side plate 82c'. The crank arm 84' is connected to the lift actuator 20' by a shaft 85'. The shaft 85' allows the crank arm 84' to be set off a distance D from the lift actuator 20'. This configuration allows the right side frame rail 12a' to be enclosed with a plate 83a' having an elongated slot 83b' configured to accommodate the movement of the shaft 85' back and forth within the enclosed right side frame rail 12a' during operation of the lift actuator 20'. The other lift actuators 18, 22 and 24 can also have the same enclosed type frame rail configuration. The plate 83a' can be connected to the right side frame rail 12a' by welding, bolting, riveting and/or by using fasteners.

Figure 11:
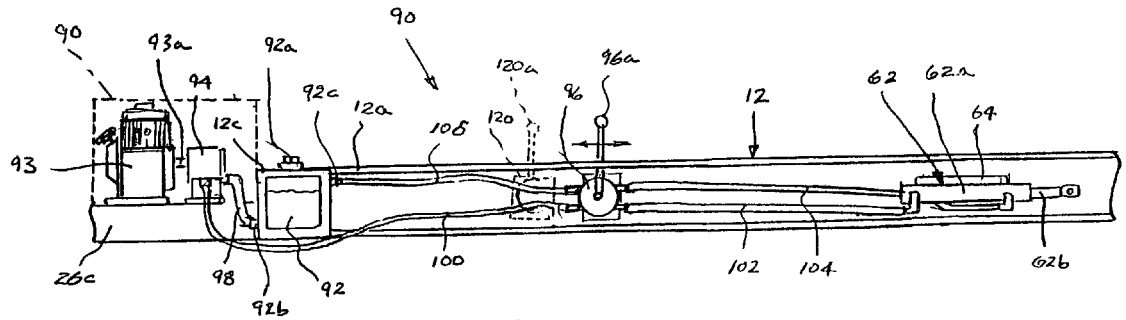
FIG. 11 is a partial broken away side elevational view of the inside of the right side frame rail of the lift trailer device shown in FIG. 1 showing the hydraulic system for the hydraulic ram.

A hydraulic system 90 for the lift trailer device 10 according to the present invention is shown in FIG. 11.

The hydraulic system 90 includes a tank 92, a motor 93 (e.g. 4-cycle gasoline engine), hydraulic pump 94, and hydraulic control unit 96 connected to and configured to operate the hydraulic ram 62. The tank 92 is defined by the front transverse box beam or tube 12c of the frame 12 hermetically welded and sealed to also function as a tank for hydraulic fluid. Alternatively, a separate tank can be connected to the frame 12 for this purpose. The tank 92 is provided with a closure 92a to allow hydraulic fluid to be filled into the tank 92. For example, the closure 92a can be an internally threaded metal flange welded to the top of the tank and contiguous with a through hole into the tank 92, and an outer threaded plug removeably disposed therein. The tank 92 is also provided with an outlet hose connector 92b and an inlet hose connector 92c.

The tank 92 is connected to the hydraulic pump 94 by supply hose 98. The engine 93 is mechanically coupled to the hydraulic pump 94 by crankshaft 93a. The hydraulic pump 94 is connected to the hydraulic control unit 96 by high-pressure supply hose 100. The hydraulic control unit 96 is provided with a control handle 96a for actuating the hydraulic control unit 96. The hydraulic control unit 96 is connected to the hydraulic ram 62 by supply/return hoses 102, 104, and the hydraulic control unit 96 is connected to the tank 92 by return hose 106.

Figure 12:
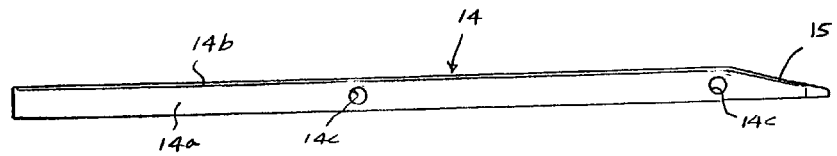
FIG. 12 is a side elevational view of the flat bed of the lift trailer device shown in FIG. 1.
Figure 12A:
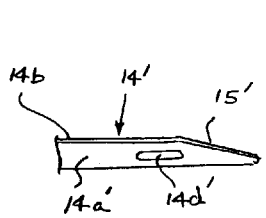
FIG. 12A is a partial broken away side elevational view of a back portion of an alternative flat bed having an elongated slot verses a hole shown in the embodiment of FIG. 12.
Figure 13:
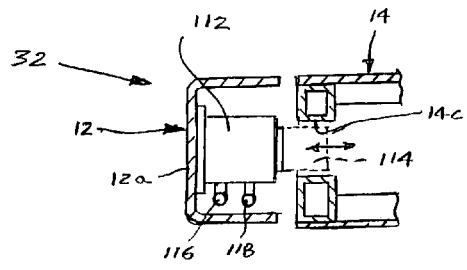
FIG. 13 is a cross-sectional view of the left side frame rail of the lift trailer device shown in FIG. 1 showing the details of one of the anchoring devices.
Figure 14:
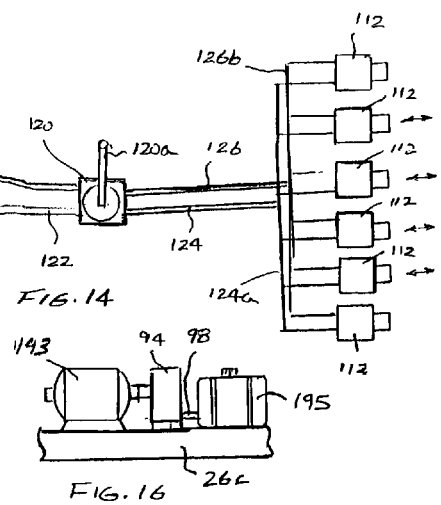
FIG. 14 is a diagrammatic view of the hydraulic locking system of the lift trailer device shown in FIG. 1.
Figure 16:
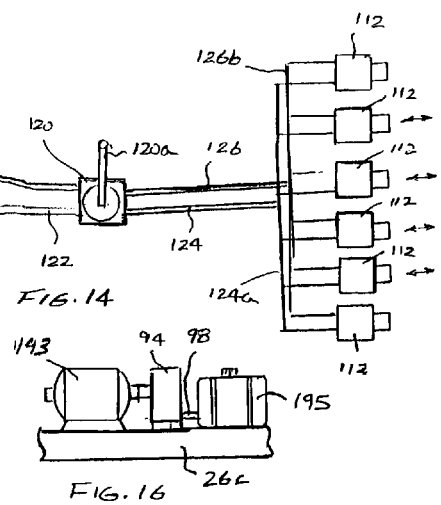
FIG. 16 is a partial broken away side elevational view of an alternative 12-volt electrical motor/hydraulic pump arrangement different from the gasoline-powered arrangement shown in FIG. 11.

The lift trailer device 10 is provided with a locking system 110 for positively locking the bed 14 to the frame 12 during transporting payload with the lift trailer device 10, as shown in FIGS. 12 to 14.

The flat bed 14 includes a support framework (e.g. welded beams and/or tubes) including a side frame 14a supporting a flat metal plate 14b of the flat bed 14. The side frame 14a is provided with two (2) holes or receivers 14c, as shown in FIG. 12.

The construction of one bed anchor 32 is shown in FIG. 13. The bed anchor 32 includes a hydraulically actuated locking device 112 having a movable pin 114. The locking device 112 is provided inside the left side rail 12b. There exists a total of six (6) locking devices 112 (e.g. two (2) inside right side frame rail 12a, two (2) inside left side frame rail 12b and two inside front transverse box beam or tube 12c provided with side indents or cavities to receive same) provided on the lift trailer device 10. The flat bed 14 is provided with six (6) holes or receivers 14c positioned to cooperate with the six (6) locking devices 112. When the locking devices 112 are actuated, the pins 114 extends into the holes or receivers 14c in the flat bed 14 to positively lock the bed relative to the frame 12.

Preferably, the locking system 110 (FIG. 14) is part of or connected to the hydraulic system 90 (FIG. 11) to reduce the need for duplicate components, in particular the tank 92, engine 93 and hydraulic pump 94, and reduce the cost of construction of the lift trailer device 10.

The hydraulic locking devices 112 are connected to the hydraulic system 90 shown in FIG. 11. Specifically, as shown in FIG. 14, another control unit 120 is connected to the hydraulic pump 94 of hydraulic system 90 by high-pressure hose 122. The hydraulic control unit 120 is provided with a control handle 102a. The hydraulic control unit 120 is connected to the six (6) hydraulic locking devices 112 by supply/return hoses 124, 126, which split into supply/return circuits 124a, 126a. Preferably, all six (6) bed anchors 30 are actuated simultaneously by the single control actuator 120 to simplify the locking and unlocking procedure. However, the hydraulic system can be reconfigured so that the bed anchors 30 are independently and selectively actuated one at a time to provide locking redundancy for safety reasons.

The control actuator 120 can be also mounted on the right side frame rail 12a near the hydraulic control unit 96 for the hydraulic rams 62, as shown in FIG. 11, so that the operator can operate both the hydraulic rams 62 and bed anchors 30-40 from the same position. Again, the locking system 110 preferably uses the same tank 92, motor 93 and hydraulic pump 94 as the hydraulic system 94 for actuating the hydraulic ram 62. Alternatively, a separate tank, motor and/or hydraulic pump can be used for the bed anchors 30-40.

Figure 15:
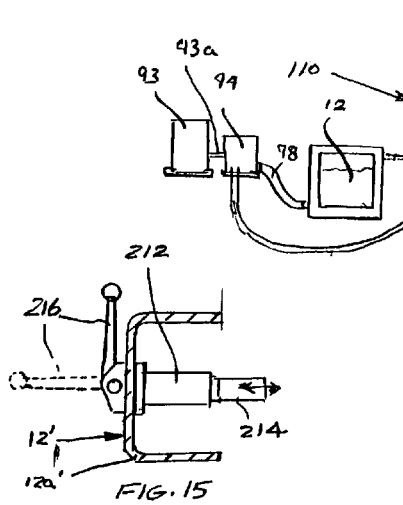
FIG. 15 is a cross-sectional view of the left side frame rail showing the details of an alternative mechanically actuated anchoring device different from the hydraulic anchoring device shown in FIG. 13.

In an alternative embodiment, the hydraulic locking devices 212 shown in FIG. 13, are each replaced with a mechanical locking device 212 shown in FIG. 15.

The mechanical locking device 212 includes a movable pin 214 actuated by handle 216. For example, the movable pin 214 is placed in a retracted position when the handle 216 is moved to a down position, and place in an extended locking position when the handle 216 is moved to an upward position. A quick glance of the mechanical locking devices 212 (e.g. six locking devices) by the operator will allow the operator to check whether the flat bed 14 is fully locked to the frame 12 by the position of the handles 216 prior to transporting the lift trailer device 10.

In a further alternative embodiment, the gas engine 93 is replaced with a 12 volt electrical motor 193 connected to the hydraulic pump 94. Further, a standalone tank 195 for containing hydraulic fluid is provide to replace the tank 92 shown in FIG. 11. The electrical motor 193 can be connected to and powered by the 12-volt electrical system of the towing vehicle (e.g. by electrical coupling).

OPERATION

The lift trailer device 10 can be loaded and unloaded when connected to or disconnected from a motor vehicle.

Figure 10:
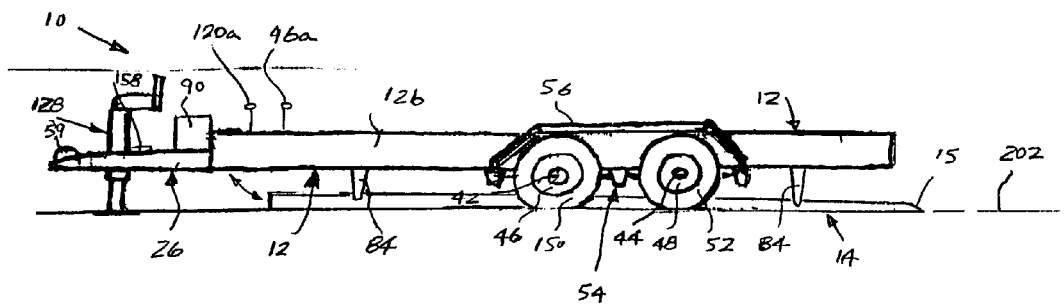
FIG. 10 is a side elevational view of the lift trailer device shown in FIG. 1 with the bed in a lowered position in contact with the ground.

During a loading operation, the control handle 120a is actuated to unlock the six (6) bed anchors 30-40. The control handle 196a is then actuated to lower the bed 14 onto the ground, as shown in FIG. 10. The load is then moved onto the bed 14 and preferably strapped into position, and then the control handle 196a is actuated to lift the bed 14 to its raised position. The control handle 120a is then actuated to positively lock the bed to the frame 12. The lift trailer device 10 is then ready for transportation of the payload.

Figure 9:
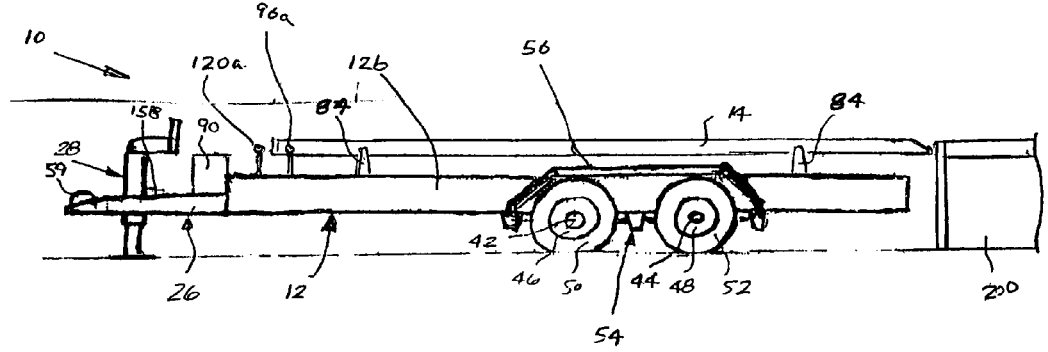
FIG. 9 is a side elevational view of the lift trailer device shown in FIG. 1 with the bed in a raised position to cooperate with a loading dock.

The lift trailer device 10 is configured so that the flat bed 14 can be infinitely positioned at any height from the fully lowered position shown in FIG. 10 to the fully raised position shown in FIG. 9. Further, the lift trailer device 10 is configured so that the flat bed 14 can be raised above or below the frame 14 (i.e. locking position) depending on the particular loading situation. In addition, the flat bed 14 moves backwards relative to frame 12 when raised or lowered from the locked position preventing the frame 12 from interfering with a loading dock during loading or unloading. This backward movement of the flat bed 14 results from the configuration of the actuators 18, 20, 22, 24 having crank arms 84.

As shown in FIG. 9, the flat bed 14 is raised above the frame 12 so that the flat bed 14 is level with the loading dock 200. As shown in FIG. 10, the flat bed 14 is lowered below the frame 12 so that the flat bed contacts the ground or loading surface 202. Further, the lift trailer device 10 is configured to tilt the flat bed 14 to facilitate loading or unloading payload by differentially raising or lowering the height of the front lift actuators 18, 22 relative to the height of the back lift actuators 20, 24.

We claim:

1. A lift trailer device, comprising:
   a frame including a right side frame rail and left side frame rail connected to a front transverse box beam;
   a trailer hitch connected to said frame;
   a suspension connected to said frame;
   at least one axle connected to said suspension;
   at least one set of tires and wheels connected to said at least one axle;
   a flat bed movably connected to said frame, said movable flat bed being nested within said frame on the front and sides, and having an exposed trailing edge;
   a pair of right side lift actuators connecting said movable flat bed to said frame, said pair of right side lift actuators located within said right side frame rail, said pair of right side lift actuators, including:
   a right side slide actuator located within said right side frame rail, said right side slide actuator being provided with a pair of right side movable racks;
   a hydraulic ram connected between said right side frame rail and said right side slide actuator configured for moving said right side slide actuator back and forth relative to said right side frame rail;
   a pair of right side stationary racks located within and connected to said right side frame rail, said right side stationary racks being configured to cooperate with said right side movable racks;
   a pair of right side pinions located within said right side frame rail and each said right side pinions being located between and cooperating with one of said right side movable racks and one of said right side stationary racks;
   a pair of right side crank arms each connected at one end to one of said right side pinions and connected at an opposite free end and supporting said movable flat bed, whereby when said hydraulic ram is actuated both said pairs of right side pinions and said right side crank arms are driven and rotated simultaneously by said right side movable racks of said right side slide actuator to raise or lower said flat bed relative to said frame;
   a pair of left side lift actuators connecting said movable flat bed to said frame, said pair of left side lift actuators being located within said right side frame rail, said pair of left side lift actuators, including:
   a left side slide actuator located within said left side frame rail, said left side slide actuator being provided with a pair of left side movable racks;
   a hydraulic ram connected between said left side frame rail and said left side slide actuator configured for moving said left side slide actuator back and forth relative to said left side frame rail;
   a pair of left side stationary racks located within and connected to said left side frame rail, said left side stationary racks being configured to cooperate with said left side movable racks;
   a pair of left side pinions located within said left side frame rail and each said left side pinions being located between and cooperating with one of said left side movable racks and one of said left side stationary racks;
   a pair of left side crank arms each connected at one end to one of said left side pinions and connected at an opposite free end and supporting said movable flat bed, whereby when said hydraulic ram is actuated both said pairs of left side pinions and left side crank arms are driven and rotated simultaneously by said left side movable racks of said left side slide actuator to raise and lower said flat bed relative to said frame;
   a locking system provided on said lift trailer device, said locking system configured for selectively positively locking said flat bed to said frame; and
   a left side slide actuator located within said left side frame rail, said left side slide actuator being provided with a pair of left side movable racks;
   a hydraulic ram connected between said left side frame rail and said left side slide actuator configured for moving said left side slide actuator back and forth relative to said left side frame rail;
   a pair of left side stationary racks located within and connected to said left side frame rail, said left side stationary racks being configured to cooperate with said left side movable racks;
   a pair of left side pinions located within said left side frame rail and each said left side pinions being located between and cooperating with one of said left side movable racks and one of said left side stationary racks;
   a pair of left side crank arms each connected at one end to one of said left side pinions and connected at an opposite free end and supporting said movable flat bed, whereby when said hydraulic ram is actuated both said pairs of left side pinions and left side crank arms are driven and rotated simultaneously by said left side movable racks of said left side slide actuator to raise and lower said flat bed relative to said frame;
   a locking system provided on said lift trailer device, said locking system configured for selectively positively locking said flat bed to said frame; and
   a hydraulic system provided on said lift trailer device, said hydraulic system configured for simultaneously and selectively operating said right side hydraulic ram and said left side hydraulic ram for raising and lowering said flat bed relative to said frame, wherein said lift trailer device is configured to raise said flat bed above said frame or lower said flat bed below said frame to accommodate loading and unloading payload from the ground or a loading dock or any height inbetween thereof.

2. A device according to claim 1, wherein said front transverse box beam is also configured as a tank for hydraulic fluid for said hydraulic system.

3. A device according to claim 1, wherein said flat bed is configured in both size and shape to closely nest within said frame providing a small and uniform clearance between an outer edge of said bed and an inner edge of said frame to allow for relative movement there between.

4. A device according to claim 1, wherein said frame is rectangular shaped and said flat bed is rectangular shaped.

5. A device according to claim 1, wherein a back end of said frame is open ended to expose a back edge of said bed.

6. A device according to claim 1, wherein said device is configured so that said flat bed is located in a same plane as said frame when said flat bed is in a raised position.

7. A device according to claim 1, wherein said device is configured so that a plane of said flat bed is maintained parallel to a plane of said frame when said flat bed is raised and lowered.

8. A device according to claim 1, wherein said device is configured to raise and lower said flat bed relative to said frame while said frame is supported stationary by said wheels and said tires.

9. A device according to claim 1, wherein said lift actuators are configured to raise and lower said bed at four spaced apart points on said bed located at apexes of a rectangle.

10. A device according to claim 1, wherein said lift actuators are defined by one pair of separate independent actuators located on opposite sides of said bed and located between said flat bed and said frame.

11. A device according to claim 1, wherein said lift actuators each include a clevis and pin for connecting to connecting arm of each said slide actuator.

12. A device according to claim 11, wherein said actuators are configured to be selectively operated independently to allow for tilting of said bed.

13. A device according to claim 1, wherein a forward pair of lift actuators are located at a same forward location along a length of said flat bed and a rearward pair of lift actuators are located at a same rearward location along a length of said flat bed, and said forward location and rearward location are spaced apart.

14. A device according to claim 1, wherein said flat bed is constructed of a bed frame connected to a bed deck.

15. A device according to claim 1, wherein said side rails are C-shaped steel frame channels.

16. A device according to claim 1, wherein a back end of said flat bed is tapered to provide a ramp end portion.

17. A lift trailer device, comprising:
a U-shaped frame;
a flat bed movably supported by said frame;
a trailer hitch connected to said frame;
a suspension connected to said frame;
at least one axle connected to said suspension;
a pair of right side pinions located within a right side frame rail and each said right side pinions being located between and cooperating with a right side movable rack and a right side stationary rack;
a pair of right side crank arms each connected at one end to one of said right side pinions and connected at an opposite free end and supporting said movable flat bed, whereby when said hydraulic ram is actuated both said pairs of right side pinions and said right side crank arms are driven and rotated simultaneously by said right side movable rack connected to a right side slide actuator to raise and lower said flat bed relative to said frame;
a pair of left side pinions located within a left side frame rail and each said left side pinions being located between and cooperating with a left side movable rack and a left side stationary rack;
a pair of left side crank arms each connected at one end to one of said left side pinions and connected at an opposite free end and supporting said movable flat bed, whereby when said hydraulic ram is actuated both said pairs of left side pinions and said left side crank arms are driven and rotated simultaneously by said left side movable racks connected to a left side slide actuator to raise and lower said flat bed relative to said frame;
a locking system provided on said lift trailer device, said locking system configured for selectively positively locking said flat bed to said frame; and
a hydraulic system provided on said lift trailer device, said hydraulic system configured for simultaneously and selectively operating said right side hydraulic ram and said left side hydraulic ram for raising and lowering said flat bed relative to said frame,
wherein said lift trailer device is configured to raise said flat bed above said frame or lower said flat bed below said frame to accommodate loading and unloading payload from the ground or a loading dock or any height inbetween thereof.

18. A device according to claim 17, wherein said locking system includes at least one locking device provided on said frame and at least one corresponding pin receiver provided on a side of said flat bed, said locking device including a movable pin configured to be selectively moved in and out of said pin receiver of said flat bed to positively lock said movable bed relative to said frame.

19. A device according to claim 18, wherein said flat bed is constructed of tubing having a pin receiver disposed within said tubing.

* * * * *